United States Patent Office 2,759,925
Patented Aug. 21, 1956

2,759,925

PROCESS FOR PREPARING CELLULOSE DICARBOXYLIC ACID ESTERS

Gordon D. Hiatt, John W. Mench, and John Emerson, Rochester, N. Y., assignors to Eastman Kodak Company, Rochester, N. Y., a corporation of New Jersey No Drawing. Application February 20, 1952, Serial No. 272,697

16 Claims. (Cl. 260—225)

This invention relates to a process for preparing cellulose dicarboxylic acid esters in which a lower fatty acid is employed as the solvent therein, and an acid-soluble salt showing a basic reaction is employed as the catalyst.

Various methods have been suggested for the preparation of dicarboxylic acid esters of cellulose. In some of these the bath has contained a large amount of pyridine which acted both as the solvent and as the catalyst therein. This has been none too satisfactory, both because of the expense involved and the well-known objectionable features of working with pyridine. Also, in the case of preparing maleic acid esters of cellulose, pyridine and maleic anhydride react with each other, which adds to the difficulty of a method of this type.

Other methods of preparing dicarboxylic acid esters of cellulose have been suggested in which a volatile organic solvent has been employed either to replace part of the pyridine or, in cases where the starting material was soluble in the solvent, to act as a solvent for the cellulose derivative initially employed. However, it has been thought heretofore when cellulose, for instance, was esterified under anhydrous conditions but using acetic acid as the diluent in the esterification mass, that acetyl would be added to the cellulose in an appreciable amount, and acetic acid, therefore, would not be an inert solvent in such a reaction.

One object of our invention is to provide a method for preparing dicarboxylic acid esters of cellulose in which a lower aliphatic acid is employed as the solvent therein. Another object of our invention is to provide a process for the preparation of dicarboxylic acid esters of cellulose from which materials which are difficult with which to work, such as pyridine per se or solvents of a volatile or inflammable nature, are absent. A further object of our invention is to provide a method for preparing dicarboxylic acid esters of cellulose in which an acid-soluble salt is employed as the catalyst therein. Other objects of our invention will appear herein.

We have found that cellulose esters of good quality are obtained if cellulose or a partially hydrolyzed cellulose derivative is reacted with a dicarboxylic acid anhydride in a bath in which a lower aliphatic acid is employed as the solvent, and a basic salt is employed as the catalyst, and that little or no introduction of acyl other than that of the dicarboxylic acid takes place. In such reaction, the bath should either be completely anhydrous, or contain such a small amount of water therein that the anhydride used is not measurably affected thereby, the criterion being that upon the addition of the anhydride the bath is anhydrous, and yet the amount of anhydride available is sufficient to effect the esterification of the cellulose.

The preparation of dicarboxylic acid esters of cellulose may be carried out using either cellulose, a cellulose ether, or a partially hydrolyzed cellulose ester as the starting material. When cellulose itself is used, the product obtained is, for all practical purposes, the simple dicarboxylic acid ester of cellulose, whereas, when a cellulose derivative is employed as the starting material, the cellulose will probably contain in the finished product a considerable proportion of the groups which had already been combined therewith.

One advantage in using a lower aliphatic acid as the solvent in preparing dicarboxylic acid esters of cellulose is that many of the hydroxyl-containing cellulose derivatives employed as the starting material are soluble in these acids. Therefore, the starting material may first be dissolved in the aliphatic acid, and the carrying out of the reaction is facilitated. However, our invention contemplates also the use of cellulose itself as the starting material, in which case the cellulose only dissolves in the esterification bath as the reaction proceeds. Our invention involves the reaction upon the cellulose or cellulose derivative with the dicarboxylic acid anhydride mixed with an acid-soluble salt which imparts a basic reaction to the solution.

Some of the anhydrides which are suitable for use in preparing cellulose esters are phthalic anhydride, nitrophthalic anhydride, succinic anhydride, maleic anhydride, etc. Some of the catalysts which are especially useful for promoting this process are the acetates of the alkali metals, the alkaline earth metals or the organic amines. Some catalysts which are useful in this connection are sodium acetate, potassium acetate, calcium acetate, magnesium acetate, monomethyl amine acetate, pyridine acetate, ammonium acetate, and the like. The catalyst may be employed in a small proportion, if desired, but, on the other hand, larger proportions can be employed. Ordinarily, 100% of catalyst, based on the weight of the cellulose starting material, is sufficient, but any amount within the range of 5–150%, based on the cellulose, can be employed and will promote the esterification. With higher proportions of catalyst, the use of larger proportions of aliphatic acid is recommended than in those cases where but small proportions of catalyst are used. The amount of the lower aliphatic acid as solvent can be varied, if desired, by the individual operator. As a general rule, if the preparation of a high viscosity cellulose ester is desired, more dilution with the aliphatic acid is desirable than in those cases where low viscosity products are prepared. The amount of dicarboxylic acid anhydride employed should be such that it will supply phthalyl or other dicarboxylic acid groups to all of the hydroxyl groups which are available in the cellulose starting material used. For instance, if a cellulose derivative is employed as the starting material, less phthalic anhydride would be called for than in those cases where cellulose itself is employed as the starting material. Also, the phthalic anhydride used must be in sufficient amount so that any moisture present will not diminish the net quantity thereof below that which is necessary to impart the desired carboxylic acid radical content. The following examples illustrate our invention:

*Example 1*

One part of regenerated cellulose was soaked in distilled water for 24 hours, and then the water was removed therefrom by dewatering with acetic acid. The cellulose, containing approximately an equal part of acetic acid, was then introduced into a bath consisting of 9 parts of acetic acid, part of which had been converted to pyridine acetate by the addition of 2 parts of pyridine thereto and 8.2 parts of phthalic anhydride. The mass was maintained at steam bath temperature (100° C.) for 16 hours, whereupon the cellulose dissolved in the esterification bath. The cellulose phthalate formed was isolated by precipitation into water to which acid had been added to lower the pH thereof. The product obtained was found to have a content of 60% of combined phthalyl and 3–5% of combined acetyl.

Example 2

Cellulose acetate having an acetyl content of 32.1% was reacted with phthalic anhydride in a bath in which acetic acid was used as the solvent and pyridine had been added to convert some of the acetic acid to pyridine acetate. The baths used and the combined phthalyl contents obtained was as follows:

a. The bath used to esterify 1 part of cellulose acetate consisted of 1.2 parts of phthalic anhydride and 2.4 parts of acetic acid, part of which had been converted to pyridine acetate by the addition of 0.1 part of pyridine. A cellulose acetate phthalate was obtained having a combined phthalyl content of 26%.

b. The bath used to esterify 1 part of cellulose acetate consisted of 1.2 parts of phthalic anhydride and 2.25 parts of acetic acid, part of which had been converted to pyridine acetate by the addition of 0.25 part of pyridine. A cellulose acetate phthalate was obtained having a combined phthalyl content of 28.4%.

c. One part of cellulose acetate was esterified with a bath consisting of 1.2 parts of phthalic anhydride and 2 parts of acetic acid, part of which had been converted to pyridine acetate by the addition of 0.5 part of pyridine thereto. A cellulose acetate phthalate was obtained having a combined phthalyl content of 30%.

In each of the above examples the esterifications were carried out at a temperature of approximately 100° C. for 6 hours.

Example 3 a. 1 part of cellulose acetate, having an acetyl content of 32.1%, was esterified with a bath containing 1.2 parts of phthalic anhydride, 2.4 parts of acetic acid and 0.1 part of sodium acetate as the catalyst. A cellulose acetate phthalate was obtained having a phthalyl content of 26.1%.

b. 1 part of cellulose acetate, having an acetyl content of 32.1%, was esterified in a reaction bath consisting of 1.2 parts of phthalic anhydride, 2.25 parts of acetic acid and 0.25 part of sodium acetate catalyst. A cellulose acetate phthalate was obtained having a phthalyl content of 27.7%.

c. 1 part of cellulose acetate, having an acetyl content of 32.1%, was esterified with a bath consisting of 1.2 parts of phthalic anhydride, 2 parts of acetic acid and 0.5 part of sodium acetate. A cellulose acetate phthalate was obtained having a phthalyl content of 28.9%.

d. 1 part of cellulose acetate, having an acetyl content of 32.1%, was esterified in a bath consisting of 1.2 parts of phthalic anhydride, 1.2 parts of acetic acid and 1 part of sodium acetate. A cellulose acetate phthalate was obtained having a phthalyl content of 32%.

It was determined by analysis that in none of the processes of Examples 2 and 3 had any acetyl been introduced during the phthalation reaction.

Example 4

1 part of ethyl cellulose, having an ethoxyl content of 45.2%, was dissolved at elevated temperature in a mixture consisting of 1 part of phthalic anhydride, 2 parts of acetic acid and 0.5 part of sodium acetate. The mass was maintained at approximately 100° C. for 2.5 hours, whereupon the product obtained was isolated as described in Example 1. An ethyl cellulose phthalate was obtained containing 19.6% of combined phthalyl.

Example 5

50 parts of cellulose acetate, having an acetyl content of 31%, was mixed with 65 parts of phthalic anhydride and 50 parts of sodium acetate, all in 175 parts of propionic acid. The mass was heated for 6 hours on a steam bath and the product obtained was recovered by precipitation in water. The purified product obtained had a phthalyl content of 33.4% and an acetyl content of 21.6%.

Example 6

The above process was repeated, but butyric acid was employed as the solvent therein instead of propionic acid. The purified reaction product obtained was found to have a phthalyl content of 37.4% and an acetyl content of 19.2%.

Example 7

50 parts of dry cellulose acetate, having an acetyl content of 32%, were mixed with 175 parts of acetic acid and 50 parts of phthalic anhydride. Several runs were made using different salts as catalysts, and in each case the esterification mass was heated for 5 hours and the product was recovered therefrom. The proportions of salts used and the analysis of the product in each case are given in the following table:

| Salt | Phthalyl, percent | Acetyl, percent |
| --- | --- | --- |
| 17.5 parts of anhydrous trisodium phosphate | 25.1 | 23.1 |
| 10.0 parts of anhydrous trisodium phosphate | 26.1 | 23.3 |
| 50.0 parts of Calcium acetate | 20.2 | 25.7 |
| 30.0 parts of Magnesium acetate | 22.2 | 24.1 |
| 25.0 parts of Ammonium acetate | 12.3 | |
| None added | 7.4 | 30.3 |

Example 8

40 parts of ethyl cellulose, having an ethoxyl content of 45%, were mixed with the following: 63 parts of nitrophthalic anhydride, 20 parts of sodium acetate, and 140 parts of acetic acid. The mass was heated for 6 hours on a steam bath. The product obtained was found to have a nitrophthalyl content of 29.7%.

Example 9

The 75-part samples of ethyl cellulose, having an ethoxyl content of 49%, were mixed with 60 parts of sodium acetate and 225 parts of acetic acid. To one was added 51 parts of succinic anhydride, and to the other 54 parts of maleic anhydride. After heating on the steam bath for a time, the products were recovered by precipitation and washing. The first sample analyzed 12% succinyl and the second 10.8% maleyl.

Example 10

Some regenerated cellulose was soaked in water, the water was displaced with glacial acetic acid, and the product was pressed so as to contain 1 part of acetic acid per part of cellulose. The cellulose was mixed with 4 parts of phthalic anhydride, 2 parts of sodium acetate and 8 parts of a 1:1 acetic acid-formic acid mixture. The mass was heated for 36 hours on the steam bath and the product obtained was recovered by mixing and washing in water. The purified product obtained had a phthalyl content of 30.4% and was soluble in pyridine-water.

Example 11

Cotton linters were soaked in 15% strength aqueous sodium hydroxide for 1 hour at room temperature and were then washed with distilled water and the water was displaced with glacial acetic acid and pressed. The resulting product consisted of equal parts of cotton linters and acetic acid. 2 parts of this material were mixed with 10 parts of acetic acid, 3 parts of sodium acetate, and 4 parts of phthalic anhydride, and the mass was heated for 50 hours. It was then diluted with acetic acid, precipitated and washed in water. The cellulose phthalate obtained contained 67.4% phthalyl. The phthalations, in accordance with our invention, were found to be conveniently carried out by heating with steam, such as at temperatures in the vicinity of 100° C. Using this temperature ordinarily 5–6 hours were sufficient, and also the mass was readily susceptible to mixing, even using a minimum proportion of solvent. However, other temperatures might be employed, such as from 60° C. up to the reflux temperature of the reaction solvent, and ordinarily the time for the reaction would be shortened by increased temperatures and vice versa. The proportion of lower fatty acid employed is such that good fluidity is assured in the esterification mass, and therefore the amount of solvent which is employed is governed by the desires of the individual operator and by the form of the starting material which is employed. For instance, where cellulose is esterified, ordinarily a larger proportion of acetic acid is desirable than in those cases where a cellulose derivative which is soluble in the lower aliphatic acid is used.

We claim:

1. A process for preparing dicarboxylic acid esters of cellulose which comprises esterifying a material selected from the group consisting of cellulose, the cellulose ethers having free and esterifiable hydroxyl groups and the partially hydrolyzed cellulose esters, under substantially anhydrous conditions, with a bath essentially consisting of an anhydride selected from the group consisting of phthalic anhydride, the substituted phthalic anhydrides, succinic anhydride and maleic anhydride, a lower fatty acid as the solvent therein and an acid-soluble salt which exhibits basic properties in non-aqueous aliphatic acid solution, for sufficient time to impart a substantial dicarboxylic acid radical content to the material, the product obtained being in solution in the esterification liquid.

2. A process for preparing phthalic acid esters of cellulose which comprises esterifying a material selected from the group consisting of cellulose, the cellulose ethers having free and esterifiable hydroxyl groups and the partially hydrolyzed cellulose esters, under substantially anhydrous conditions with a bath essentially consisting of phthalic anhydride, a lower fatty acid as the solvent therein and an acid soluble salt which exhibits basic properties in non-aqueous aliphatic acid solution, for a sufficient time to impart a substantial phthalyl content to the material, the product obtained being in solution in the esterification liquid.

3. A process for preparing dicarboxylic acid esters of cellulose which comprises esterifying a material selected from the group consisting of cellulose, the cellulose ethers having free and esterifiable hydroxyl groups and the partially hydrolyzed cellulose esters, under substantially anhydrous conditions, with a bath essentially consisting of an anhydride selected from the group consisting of phthalic anhydride, the substituted phthalic anhydrides, succinic anhydride and maleic anhydride, acetic acid as the solvent therein and an acid-soluble salt which exhibits basic properties in non-aqueous aliphatic acid solution, for a sufficient time to impart a substantial dicarboxylic acid radical content to the material, the product obtained being in solution in the esterification liquid.

4. A process of preparing cellulose acetate dicarboxylates which comprises esterifying partially hydrolyzed cellulose acetate under substantially anhydrous conditions with a bath essentially consisting of an anhydride selected from the group consisting of phthalic anhydride, the substituted phthalic anhydrides, succinic anhydride and maleic anhydride, a lower fatty acid as the solvent therein and an acid-soluble salt which exhibits basic properties in non-aqueous aliphatic acid solution, for a sufficient time to impart a substantial dicarboxylic acid radical content to the material, the product obtained being in solution in the esterification liquid.

5. A process for preparing cellulose ether dicarboxylates which comprises esterifying a cellulose ether having free and esterifiable hydroxyl groups, under substantially anhydrous conditions, with a bath essentially consisting of an anhydride selected from the group consisting of phthalic anhydride, the substituted phthalic anhydrides, succinic anhydride and maleic anhydride, a lower fatty acid as the solvent therein and an acid-soluble salt which exhibits basic properties in non-aqueous aliphatic acid solution, for a sufficient time to impart a substantial dicarboxylic acid radical content to the material, the product obtained being in solution in the esterification liquid.

6. A process for preparing dicarboxylic acid esters of cellulose which comprises esterifying a material selected from the group consisting of cellulose, the cellulose ethers having free and esterifiable hydroxyl groups and the partially hydrolyzed cellulose esters under substantially anhydrous conditions with a bath essentially consisting of an anhydride selected from the group consisting of phthalic anhydride, the substituted phthalic anhydrides, succinic anhydride and maleic anhydride, a lower fatty acid as the solvent therein and an acid-soluble acetate which exhibits basic properties in non-aqueous aliphatic acid solution, for a sufficient time to impart a substantial dicarboxylic acid radical content to the material, the product obtained being in solution in the esterification liquid.

7. A process for preparing cellulose acetate phthalates which comprises esterifying partially hydrolyzed cellulose acetate, under substantially anhydrous conditions, with a bath essentially consisting of phthalic anhydride, a lower fatty acid as the solvent therein and an acid soluble salt which exhibits basic properties in non-aqueous aliphatic acid solution, for a sufficient time to impart a substantial phthalyl content to the cellulose acetate, the product obtained being in solution in the esterification liquid.

8. A process for preparing cellulose ether phthalates which comprises esterifying a cellulose ether having free and esterifiable hydroxyl groups, under substantially anhydrous conditions, with a bath essentially consisting of phthalic anhydride, a lower fatty acid as the solvent therein and an acid soluble salt which exhibits basis properties in non-aqueous aliphatic acid solution, for a sufficient time to impart a substantial phthalyl content to the cellulose ether, the product obtained being in solution in the esterification liquid.

9. A process for preparing cellulose acetate phthalates which comprises esterifying partially hydrolyzed cellulose acetate under substantially anhydrous conditions with a bath essentially consisting of phthalic anhydride, acetic acid as the solvent therein and an acid soluble salt which exhibits basic properties in non-aqueous aliphatic acid solution, for a sufficient time to impart a substantial phthalyl content to the cellulose acetate, the product obtained being in solution in the esterification liquid.

10. A process for preparing cellulose ether phthalates which comprises esterifying ethyl cellulose having free and esterifiable hydroxyl groups under substantially anhydrous conditions with a bath essentially consisting of phthalic anhydride, acetic acid as the solvent therein and an acid soluble salt which exhibits basic properties in non-aqueous aliphatic acid solution for a sufficient time to impart a substantial phthalyl content to the cellulose ether, the product obtained being in solution in the esterification liquid.

11. A process for preparing cellulose acetate phthalates which comprises esterifying partially hydrolyzed cellulose acetate, under substantially anhydrous conditions, with a bath essentially consisting of phthalic anhydride, a lower fatty acid as the solvent therein and sodium acetate, for a sufficient time to impart a substantial phthalyl content to the cellulose acetate, the product obtained being in solution in the esterification liquid.

12. A process for preparing cellulose ether phthalate which comprises esterifying ethyl cellulose having free and esterifiable hydroxyl groups with a bath essentially consisting of phthalic anhydride, a lower fatty acid as the solvent therein and sodium acetate, for a sufficient time to impart a substantial phthalyl content to the material, the product obtained being in solution in the esterification liquid.

13. A process for preparing cellulose acetate phthalate which comprises esterifying partially hydrolyzed cellulose acetate, under substantially anhydrous conditions, with a bath essentially consisting of phthalic anhydride, a lower fatty acid as the solvent therein and pyridine acetate, for a sufficient time to impart a substantial phthalyl content to the cellulose acetate, the product obtained being in solution in the esterification liquid.

14. A process for preparing cellulose acetate succinate which comprises esterifying partially hydrolyzed cellulose acetate, under substantially anhydrous conditions, with a bath essentially consisting of succinic anhydride, a lower fatty acid as the solvent therein and sodium acetate, for a sufficient time to impart a substantial succinyl content to the cellulose acetate, the product obtained being in solution in the esterification liquid.

15. A process for preparing cellulose acetate maleate which comprises esterifying partially hydrolyzed cellulose acetate, under substantially anhydrous conditions, with a bath essentially consisting of maleic anhydride, a lower fatty acid as the solvent therein and sodium acetate, for a sufficient time to impart a substantial maleyl content to the cellulose acetate, the product obtained being in solution in the esterification liquid.

16. A process for preparing cellulose acetate phthalate which comprises esterifying partially hydrolyzed cellulose acetate, under substantially anhydrous conditions, with a bath essentially consisting of phthalic anhydride, acetic acid as the solvent therein and sodium acetate, for a sufficient time to impart a substantial phthalyl content to the cellulose acetate, the product obtained being in solution in the esterification liquid.

References Cited in the file of this patent

UNITED STATES PATENTS

| | | |
|---|---|---|
| 1,936,976 | Becker et al. | Nov. 28, 1933 |
| 2,285,536 | Seymour et al. | June 9, 1942 |
| 2,358,387 | Dreyfus | Sept. 19, 1944 |
| 2,420,499 | Ruperti | May 13, 1947 |

OTHER REFERENCES

"Cellulose Chem." (Heuser), published by John Wiley & Sons, Inc., New York, New York (1947); (page 228 as cited).